UNITED STATES PATENT OFFICE.

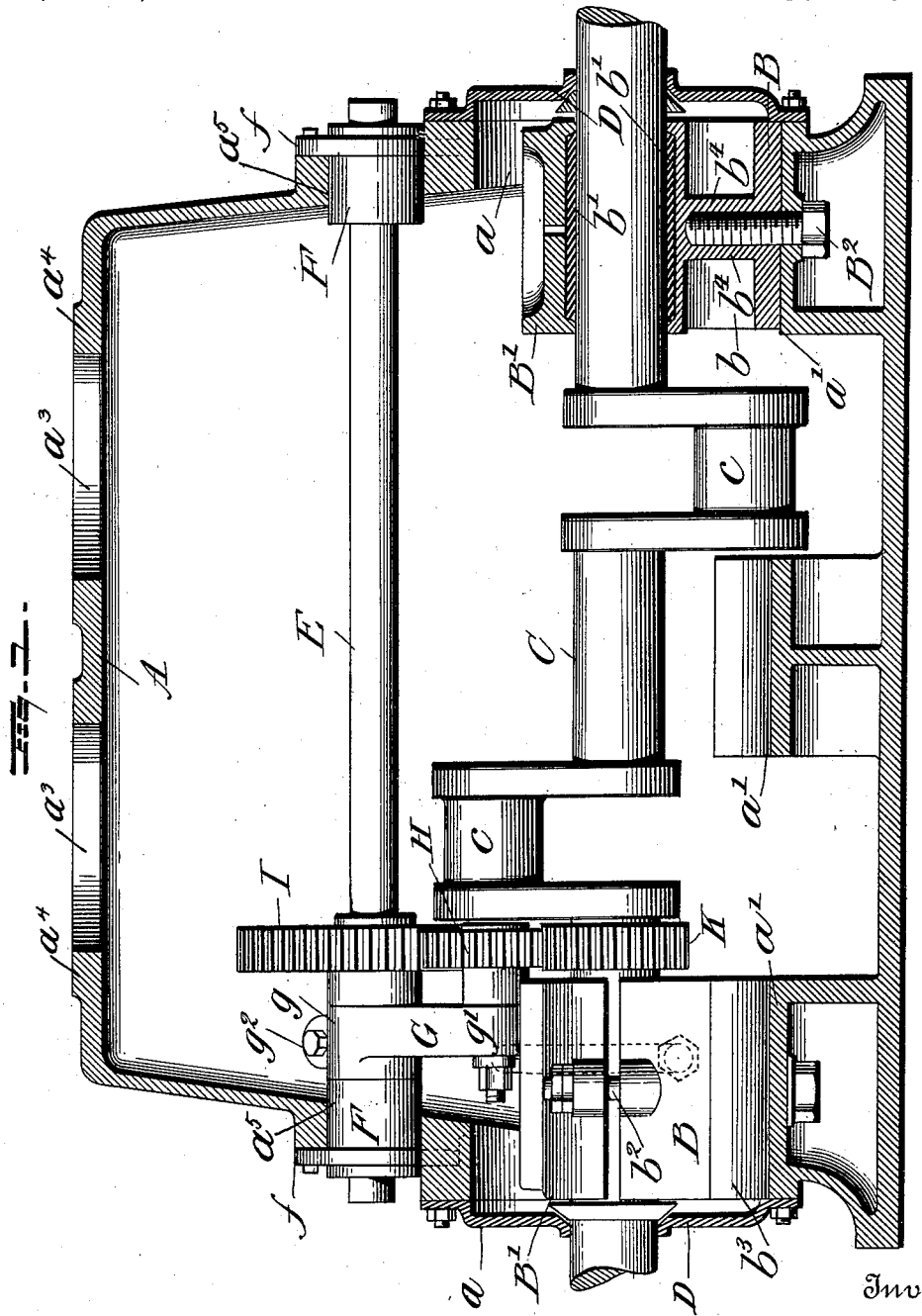

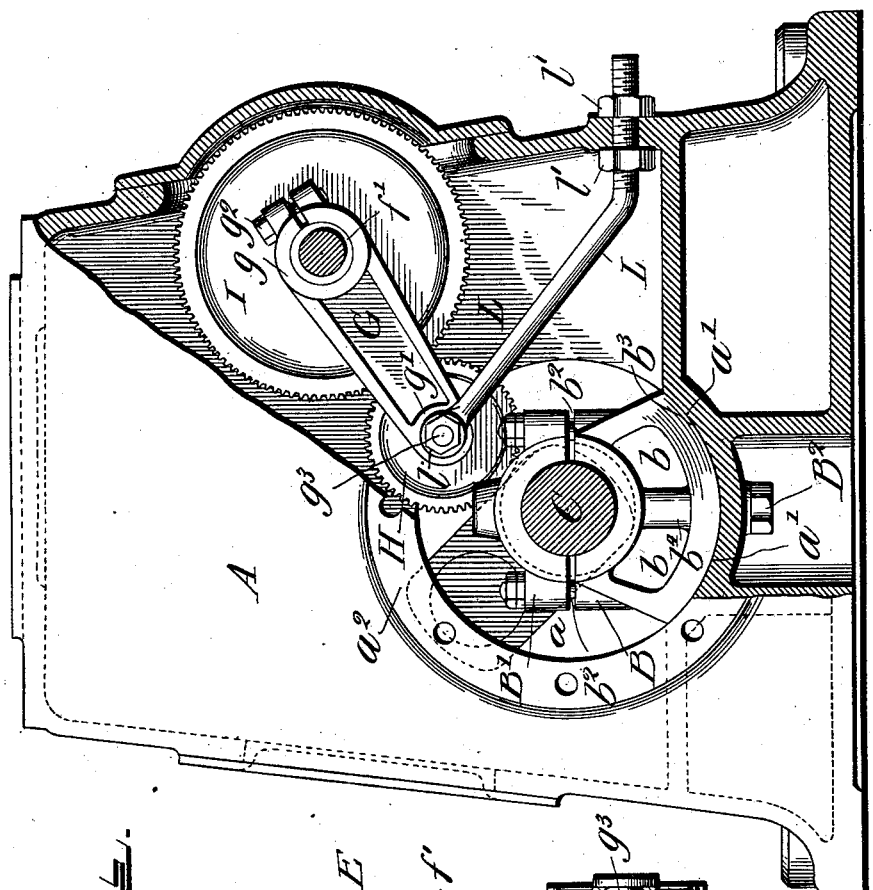
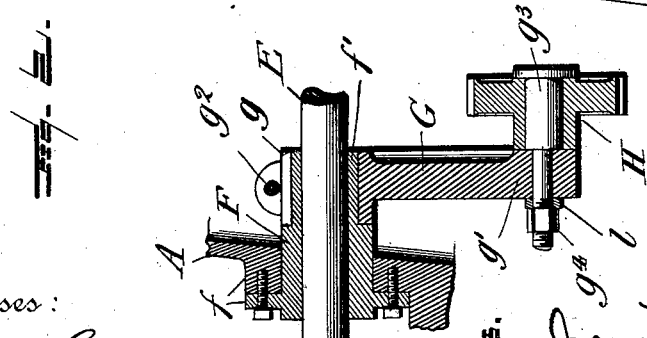

JESSE WALRATH, OF RACINE, WISCONSIN.

ENGINE-BEARING.

SPECIFICATION forming part of Letters Patent No. 673,308, dated April 30, 1901.

Application filed November 29, 1899. Serial No. 738,660. (No model.)

*To all whom it may concern:*

Be it known that I, JESSE WALRATH, a citizen of the United States, residing at Racine, in the county of Racine and State of Wisconsin, have invented certain new and useful Improvements in Engine-Bearings; and I do hereby declare the following to be a full, clear, and exact description of the invention, such as will enable others skilled in the art to which it appertains to make and use the same.

My invention is illustrated in the accompanying drawings, which show one form in which I have contemplated embodying it; and the invention is fully disclosed in the following description and claims.

Referring to the said drawings, Figure 1 represents a vertical sectional view taken through the base of a gas-engine and showing so much thereof as is necessary for a complete understanding of my invention. Fig. 2 is an end view of the same, partly in section. Fig. 3 is a detail sectional view of part of the construction.

In the manufacture of engines it is customary to mount the main or crank shaft in bearings carried by pillow-blocks which have flat faces to engage seats therefor planed upon the bed or frame of the engine. In such cases it is very difficult to plane the seats and pillow-blocks and bore the bearings with such accuracy that they will hold the shaft in accurate alinement, and in most cases a very large amount of handwork, filing, scraping, &c., is required to bring the shaft into exact alinement. This hand-labor adds greatly to the expense of building the engine, and at the same time it is often extremely difficult to get at the parts in order to perfectly fit them, particularly in gas or other engines, in which the shaft-bearings are located inside a closed base.

The object of my invention is to obviate the above difficulty and to prepare the pillow-blocks and the seats therefor, so that the parts when placed in operative position will hold the shaft in perfect alinement and avoid any hand-labor in the way of fitting. Furthermore, where pillow-blocks having flat bases are used they must be secured to the frame by not less than two bolts to hold them from turning on their seats. My invention provides a bearing-block which can be held rigidly in place by a single bolt or screw.

My invention is illustrated in connection with a gas or explosive engine; but it is adapted as well to any style of engine and to those having exposed bearings, as well as to those having closed bases with the bearings located within the same.

In carrying out my invention I place the engine-bed in a boring-machine, and with a boring-tool I bore out the seats for the pillow-blocks, which will therefore be segments of perfectly-true cylinders. I then take the pillow or bearing blocks, babbitt them and clamp them upon a mandrel of exactly the diameter of the crank-shaft. I then place the mandrel in a lathe and turn the bottom or seat-engaging portions of the said blocks down to exactly the radius of the bore produced by the boring-tool in preparing the seats. It is perfectly obvious, therefore, that when the blocks are placed in their seats the bearings must of necessity be exactly in alinement without any fitting.

In the drawings, A represents the base of a two-cylinder gas or other explosive engine. This base is provided with a circular aperture $a$ at each end for the insertion and removal of the crank-shaft and its bearings, and the said base is also provided with two or more seats $a'$, which are segments of true cylinders, with the axis of the crank-shaft for their centers. The end faces $a^2$, surrounding the apertures $a$, may be first planed, and then the base A is placed in a boring-machine, as above described, and a boring-tool is used to bore out the apertures $a$ and the seats $a'$ $a'$.

The pillow-blocks are ordinarily made in two parts, B representing the lower part, which is preferably cored, as indicated at $b$ $b$, Fig. 2, and B' representing the upper part. The two parts of the bearing are babbitted or filled with Babbitt metal $b'$, as usual, and are then secured together by means of the bolts $b^2$ $b^2$ upon a mandrel of exactly the size of the crank-shaft. All the bearing-blocks may be placed simultaneously upon the mandrel, and the mandrel is then placed in a lathe, and the lower faces $b^3$ $b^3$ of the blocks are turned down to the same radius as the cylindrical seats $a'\ a'$. In the drawings I have shown the base A provided with three seats $a'$, the center bearing-block being removed to show the seat, the end bearing-blocks being represented one in section and the other in elevation. The bearing-blocks are placed upon their seats, and it will be seen that when the crank-shaft is inserted in said blocks its alinement must be exactly right. In order to hold the pillow-blocks in their seats, I employ for each a single securing bolt or screw $B^2$, which is passed upwardly through an aperture in the bottom of the pillow-block seat and screws into a threaded part of the block, or is provided with a clamping-nut. In the present instance I provide a vertical tubular interiorly-threaded web $b^4$, extending between the upper and lower parts of the cored portion of the block, and the clamping or securing screw or bolt $B^2$ screws into the threaded aperture so formed. It will be seen that this construction is very cheap, simple, and accurate, and it obviates the necessity for hand-labor in fitting the blocks to their seats, which is particularly difficult to do inside of a closed base such as is shown in the drawings.

C represents the crank-shaft, provided in this instance with two cranks $c\ c$. The upper part of the base is also shown provided with apertures $a^3$, around which are seats $a^4$ for the cylinders of the engine. (Not shown.)

D D are the end plates, which are bolted or screwed to the planed end surfaces $a^2\ a^2$, around the apertures $a$, each of said plates having a central aperture through which the crank-shaft passes.

E represents the eccentric cam or second-motion shaft, which derives its motion from the crank-shaft C by means of gearing. The shaft E is mounted in two cylindrical bearings F F, inserted in bored apertures $a^5\ a^5$ in the base, which apertures may be bored while the base is on the boring-machine, having the apertures $a$ and seats $a'$ bored. Hence the cam-shaft E must be in exact alinement parallel to the crank-shaft C. The bearings F are each provided with a flange $f$, by which they are secured to the base. One of said bearings F is provided with an extension or sleeve $f'$, upon which is mounted a radius-arm G, which has at one end a split collar $g$ to engage said sleeve and at the other end a sleeve $g'$. The split collar $g$ is provided with perforated ears, through which is passed a clamping-screw $g^2$, by means of which said collar can be rigidly clamped on said sleeve to hold the arm G in its desired position. At the outer end of arm G the sleeve $g'$ is provided with a stud $g^3$, provided with a shoulder to engage the sleeve at one end and a nut $g^4$ to clamp it rigidly in the sleeve. Upon this stud $g^3$ is mounted a pinion H, which meshes with a pinion I on the cam-shaft E and which may be made to mesh with a driving-pinion K on the crank-shaft C by adjusting the arm G to the proper position, as shown. In order to brace the arm G and also to provide for its adjustment in case the parts wear, I prefer to provide a brace-rod L, secured at one end to the arm G. In this instance I provide the brace with an eye $l$, which fits over the threaded end of a stud $g^3$, between the nut $g^4$ and sleeve $g'$. The opposite end of brace L is bent at an angle, threaded, passed through an aperture in the side wall of the base, and provided on each side of said wall with a nut $l'$. By means of this construction the radius-arm can be very accurately adjusted when the parts of the engine are assembled, so as to bring the pinion H into proper relation with the driving-pinion K, and the position of said arm may be adjusted from time to time, as may become necessary to compensate for the wear of the parts.

The mechanism for connecting the crank-shaft with the second-motion shaft, herein shown and described, is not claimed herein, as it forms the subject-matter of a divisional application filed by me May 21, 1900, and given Serial No. 17,417.

What I claim, and desire to secure by Letters Patent, is—

1. The combination with an engine-base, provided with a plurality of seats having their entire upper surfaces curved to form true segments of cylinders having a common axis, of a shaft, a plurality of bearing-blocks therefor having curved faces forming true segments of cylinders having the same axis as the aforesaid seats and securing devices for holding said blocks upon said seats, whereby the accurate alinement of the shaft is secured by placing said blocks on said seats and whereby said blocks can be moved transversely on said seats without affecting the alinement of said shaft, substantially as described.

2. The combination with a hollow engine-base provided with a circular aperture at opposite sides and a plurality of internal integral seats, the said apertures and pillow-blocks being bored so as to be exactly in line with each other, a shaft, a plurality of bearing-blocks centered on said shaft and having faces turned on the same radius as the said apertures and seats of the engine-base, and bolts securing said bearing-blocks upon said seats, substantially as described.

In testimony whereof I affix my signature in the presence of two witnesses.

JESSE WALRATH.

Witnesses:
ELIZABETH S. BLAKE,
JOHN T. BLAKE.